DIRECTIONAL RADIO SYSTEM WITH DISTORTION-CORRECTING CIRCUITS

Filed April 27, 1962

3 Sheets-Sheet 1

United States Patent Office 3,273,064

Patented Sept. 13, 1966

3,273,064

DIRECTIONAL RADIO SYSTEM WITH DISTORTION CORRECTING CIRCUITS

Friedrich Künemund, Munich, Germany, assignor to Siemens & Halske Aktiengesellschaft Berlin and Munich, a corporation of Germany Filed Apr. 27, 1962, Ser. No. 190,540

Claims priority, application Germany, Apr. 28, 1961, 73,736

7 Claims. (Cl. 325—55)

The invention disclosed herein is concerned with a directional radio transmission, in particular as used in telecommunication systems, wherein a plurality of high frequency channels, having preferably closely spaced frequencies, are respectively at the sender and receiver sides combined over a combining circuit arrangement to form a common high frequency transmission.

The various objects and features of the invention will appear in the course of the description thereof which is rendered below with reference to the accompanying drawings.

Figure 1:
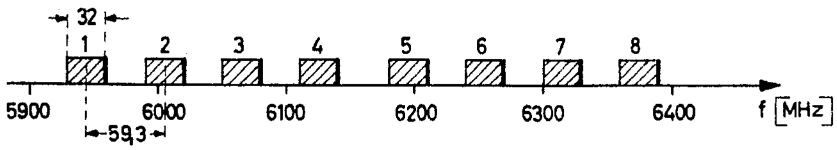
FIG. 1 shows an example of a frequency spectrum such as is often used in connection with wideband directional wireless systems.
Figure 9:
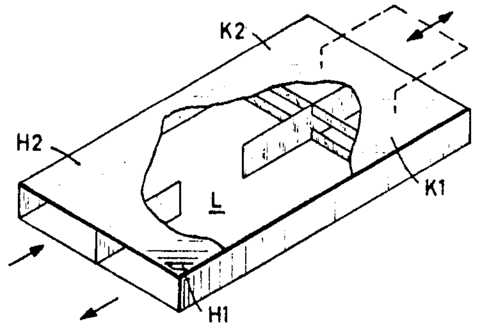
Figure 11:
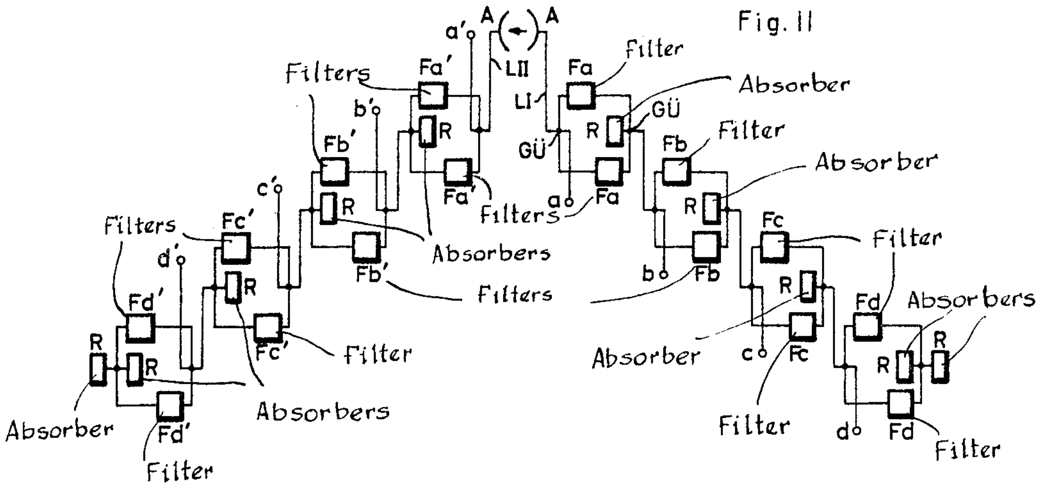
Figure 8:
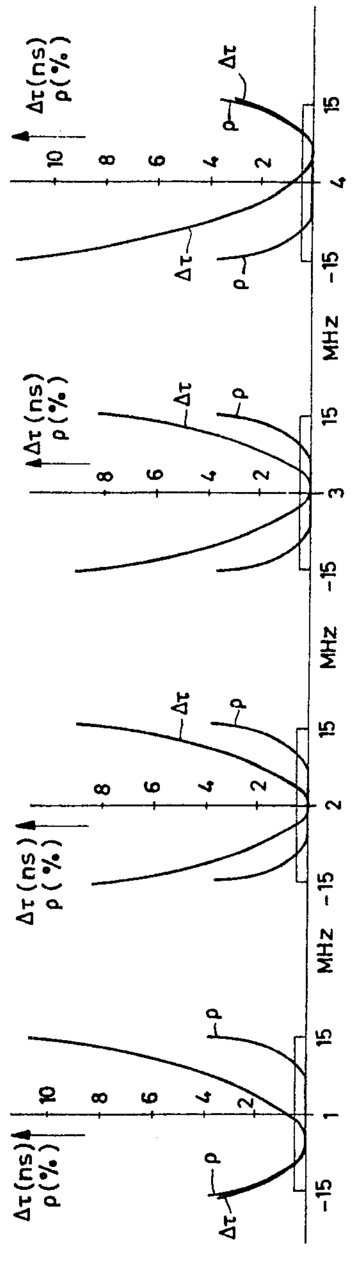
Figure 10:
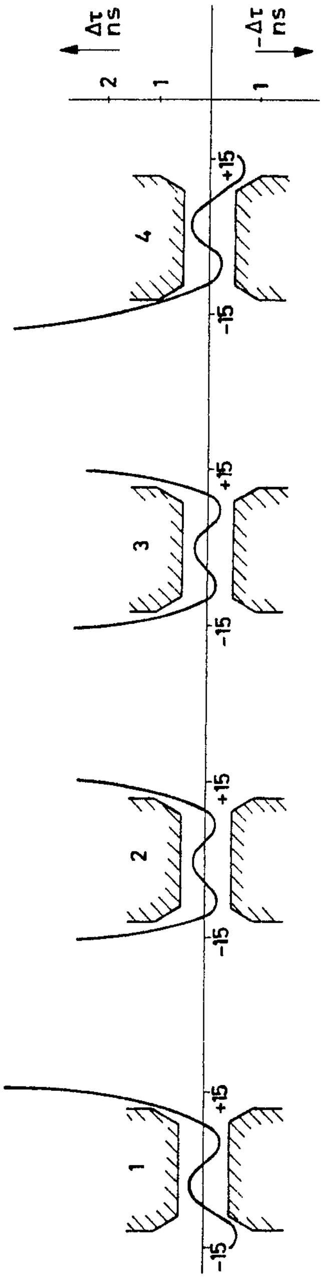

FIG. 8 indicates the timing relationship of two combining circuit arrangements of a radio transmission system and of the reflection factor $\sigma$, for four frequency-wise successive channels according to FIG. 1;

FIG. 9 represents an advantageous embodiment of a timing interval distortion corrector;

FIG. 10 indicates timing interval transmission curves for the four channels of FIG. 8, obtainable with the distortion corrector made according to FIG. 9; and FIG. 11 illustrates a radio system of the type with which the invention is concerned, in which the combining and separating circuit arrangements are formed as bridge-type circuits to which the invention can be applied.

The frequency spectrum shown as an example in FIG. 1, is intended for a system operating in the region of about 6 gigacycles. A frequency band of about 5900 to about 6400 megacycles contains eight high frequency channels, each with a width of about 32 megacycles, the mutual center frequency spacing for the four channels lying in the lower frequency positions as well as for the channels lying in the higher frequency positions amounting to about 59 megacycles. Within a radio system comprising a sender station and a cooperatively associated receiver station, there are usually taken only channels from the group of the four lower channels or from the group of the four upper channels.

Directional wireless systems of the type here involved are usually operated, for example, so that the channels lying in the lower frequency positions are utilized for the transmission field which is first, as seen in the direction of transmission, employing in the next successive transmission field the four channels lying in the higher frequency position, and utilizing the next successive again the four channels lying in the lower frequency positions, etc., thereby avoiding an undesired loop formation in the relay station which connects the successive wireless fields. For the further decoupling between channels there are frequently also applied different polarization directions for the individual channels.

In the event that several senders of a sender station of such a directional wireless system operate with respect to a common antenna, the individual sender outputs are, over known combining circuits with hybrid rings or equipped with bridge filters, combined to form a common transmission path which leads to the common antenna. A corresponding separating circuit is in such a case provided in the cooperatively associated receiver station of the respective transmission field, which frequently operates likewise with respect to a common receiver antenna, such separating circuit being operative to separate the channels received over the common antenna, and to extend respective channels to the individual receivers.

Such latter system poses a difficult problem in that the distributing circuits, with their filters and other circuit elements, cause transmission attenuations and timing distortions, which are, moreover, different for the individual channels operating with different frequency positions. It is with the aid of special distortion correction circuits possible to equalize to some extent particularly the timing distortions occurring in such systems, but the expenditure required therefor is relatively great on account of the considerable differences obtaining between the values for the individual channels operating respectively with different frequencies.

The object of the invention is to considerably reduce the requirements which are posed for the distortion correction circuits in connection with a transmission system of the initially described kind.

This object is in accordance with the invention realized, in connection with a directional radio system, wherein a plurality of high frequency channels with preferably closely spaced frequency are in and a combining circuit combined into a common high frequency bundle, by the provision of similarly constructed distributing circuits respectively employed at the sender station and at the receiver station, wherein the connections for the individual high frequency channels are in the receiver separating circuit interchanged or displaced with respect to the positions thereof in the sender combining circuit, so that at least nearly identical timing distortion values are within the corresponding transmission field present in the individual gating circuits, for all channels, and providing for the individual channels separate distortion correcting networks which are preferably similarly constructed and merely differently tuned in accordance with the individual channels.

It is of advantage, in connection with a receiver separating circuit which comprises a hybrid ring, to provide an absorber connected in reflection-free manner to the last connection thereof, as seen in cycling direction from the input point, while each of the connections lying between the absorber and the input point has a pass filter for the respective high frequency channel, which totally reflect for the other high frequency channels, when such filter is connected with the cooperatively associated receiving device. One of the connections of the hybrid ring can thereby be connected with a further hybrid ring.

It is also advantageous, in the case of a sender combining circuit comprising a hybrid ring, one terminal of which is reflection-free terminated by an absorber, while the terminal preceding in the cycling direction extends to the common transmission path for all channels, to connect to the remaining terminals the senders for the individual high frequency channels over filters which pass only the frequency of the respective high frequency channel while totally reflecting for all other high frequency channels. The hybrid ring connection leading to the common transmission path can thereby terminate as a lead-in terminal in a further combining circuit.

The individual distributing circuit can also advantageously be constructed in known manner as a bridge filter.

It has moreover been found particularly advantageous to construct the individual distortion correction circuit with the aid of a 3 dB-directional coupler in the form of two cross-sectionally rectangular mutually parallel extending wave guides which are coupled at the narrow sides, to the two terminals of which, lying at one end thereof, are connected two similar cavity resonators with identical resonance response, which resonators can be preferably tuned through in common, while the two wave guide terminals lying at the other side serve respectively as input and output terminals.

Examples of the invention will now be described more in detail.

Figure 2:
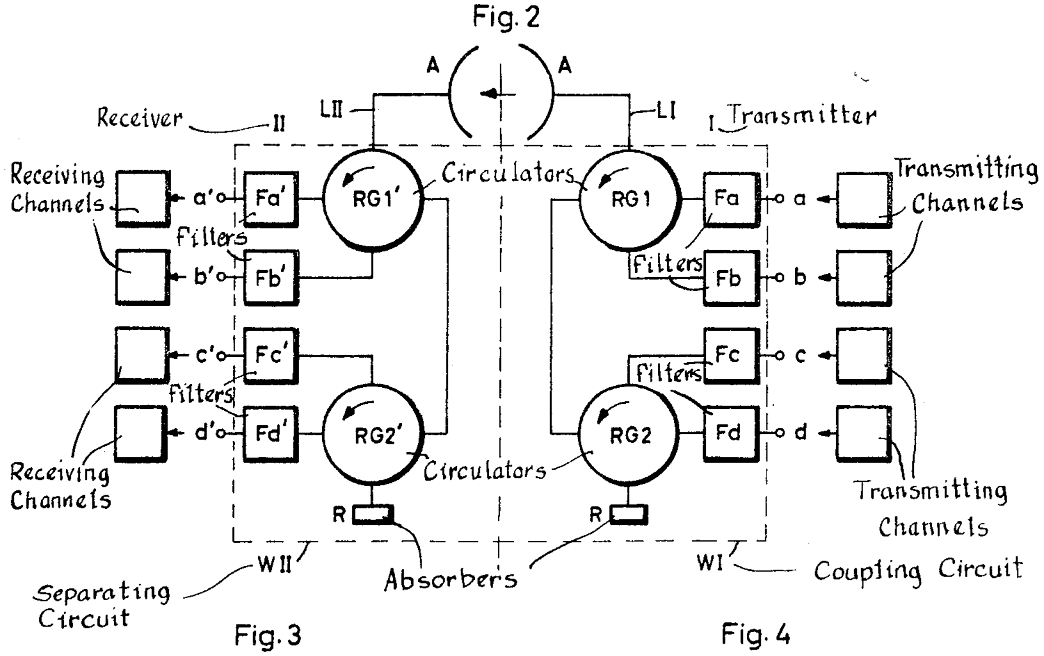
FIG. 2 represents a transmission system having a sender station I at one end and the cooperating receiver station II at the other end thereof.

FIG. 2 shows a radio system comprising the sender station I disposed at one end and the receiver station II disposed at the other end thereof. Each station operates with a common directional antenna A which is over common lead-in means LI or LII connected with the corresponding combining circuit arrangement WI or separating circuit arrangement WII. Each circuit WI and WII has four terminals respectively designated by *a, b, c, d* and *a', b', c', d'*, for the connection of four senders and four receivers, respectively, whereby each sender transmits a high frequency channel corresponding to FIG. 1 while each receiver receives a high frequency channel according to FIG. 1. The individual senders and receivers are indicated purely schematically. The schematic FIG. 2 generally illustrates the allocation of senders and receivers to the respective terminals *a* to *d* and *a'* to *d'*.

The combining circuit arrangement WI comprises two hybrid rings or circulator RG1 and RG2. To the hybrid ring RG1 is connected the common antenna lead-in LI. The connection following in the cycling direction of the ring leads to the hybrid ring RG2. The two further connections of the hybrid ring RG1 extend over filters F*a* and F*b* to the terminals *a* and *b*. Two further connections of the hybrid ring RG2 extend analogously over filters F*c* and F*d* to the terminals *c* and *d*. The connection preceding in cycling direction of the hybrid ring RG2, the connection extending to the filter F*d*, is terminated reflection-free, by an absorber R.

The separating circuit WII, containing the hybrid rings or circulator RG1' and RG2' and the filters F*a'* to F*d'*, is similarly constructed.

The following may be said concerning the filters. Each filter is tuned to a predetermined channel and passes only such high frequency channel as free of attenuation and distortion as possible. The respective filter operates for all other channels totally reflecting and as free of loss as possible. There will then be obtained the known operation of such gating circuits, whereby the oscillations, supplied for example over the filter F*d* to the hybrid ring RG2, are extended to the filter F*c* which is for such oscillations totally reflecting, such oscillations thereupon running into the lead-in extending to the hybrid ring RG1 and finally, after reflection at the filters F*a* and F*b*, reaching over the lead-in LI, the antenna A over which they are transmitted.

The individual filters may comprise, for example, identically constructed bandpass filters having, for example, five cavity resonators. The individual bandpass filters at the sender side are thereby tuned mutually different by about 59 megacycles, passing only the channels for which they are respectively tuned. The filters at the receiver side are analogously constructed.

Figure 3:
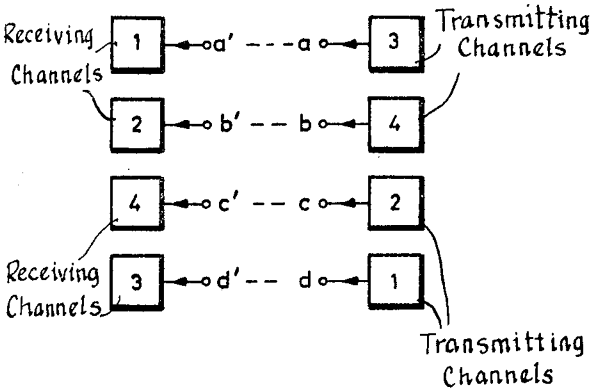
FIG. 3 illustrates one possible arrangement of connecting the individual senders and receivers in accordance with the invention.

FIG. 3 shows in schematic manner one arrangement in which the individual channels may be tuned in accordance with the invention. There are only shown the terminals *a* to *d* and *a'* to *d'* (the gating circuits, antenna, etc., being for the sake of simplification omitted) and the respective senders and receivers connected therewith, which are indicated by numbers denoting channels. For example, upon connecting to the terminals *a, b, c, d,* senders for the respective channels 3, 4, 2, 1, the terminals *a', b', c', d'* will be connected to receivers respectively indicated by the channel numbers 1, 2, 4, 3, the respective connections extending over filters which are tuned to the corresponding channels. Moreover, a timing interval distortion corrector is to be included in the high frequency path from the sender to the receiver, such distortion corrector having been omitted in FIG. 2 for reasons of simplification. For example, the distortion corrector for the connection *a* is disposed preferably ahead of the filter F*a* and the distortion corrector for the connection *a'* is preferably disposed serially after the filter F*a'*, thereby additionally resulting in favorable conditions for the pass attenuations.

FIGS. 4 to 7 show further compensation possibilities for the connection of the individual senders and receivers in accordance with the invention.

Figure 4:
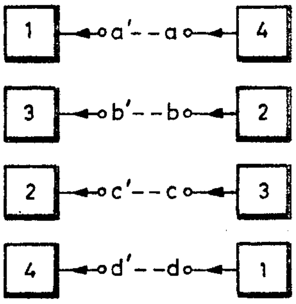
FIGS. 4 to 7 show further compensation possibilities for the connection of the individual senders and receivers in accordance with the invention.

In accordance with FIG. 4, channels 1, 2, 3, 4 at the sender side feed respectively over the terminals *d, b, c, a*, and the channels 1, 2, 3, 4 are at the receiver side obtained over the terminals *a', c', b'* and *d'*.

Figure 5:
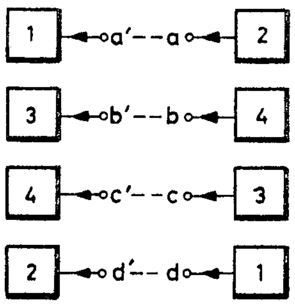

In accordance with the scheme shown in FIG. 5, the channels 1, 2, 3, 4 at the sender side feed respectively over the terminals *d, a, c* and *b*, and the channels 1, 2, 3, 4 are at the receiver side obtained over the terminals *a', d', b'* and *c'*.

Figure 6:
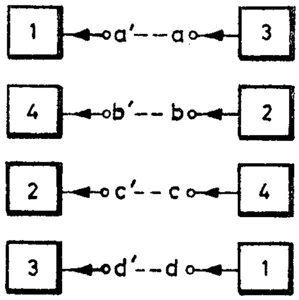

In accordance with the scheme shown in FIG. 6, the channels 1, 2, 3, 4 at the sender side feed respectively over the terminals *d, b, a, c*, and these channels 1, 2, 3, 4 are at the receiver side obtained over the terminals *a', c', d'* and *b'*.

Figure 7:
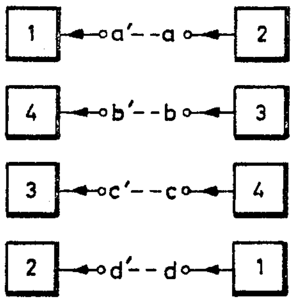

In accordance with the scheme shown in FIG. 7, the channels 1, 2, 3, 4 at the sender side feed respectively over the terminals *d, a, b* and *c*, and these channels 1, 2, 3, 4 are at the receiver side obtained over the terminals *a', d', c'* and *b'*.

The channels 1, 2, 3, 4 are analogously allocated to the terminals *a, b, c, d*.

FIG. 8 shows the timing interval relationship or operation of the two distributor circuit arrangements of a radio system and the reflection factor $\sigma$, for four channels according to FIG. 1, which channels follow successively according to the frequencies thereof. In FIG. 8 has been plotted the timing interval difference $\Delta\tau$, considered from an average running time, and the reflection factor $\sigma$, based upon filters comprising respectively five cavity resonators. It will be seen from this figure that the arrangement according to the invention provides for timing interval or running time curves which are practically substantially identical and that the pass through attenuations are likewise practically identical for all channels. Accordingly, identical distortion correctors can be used for all channels, requiring merely somewhat different tuning of the timing or running time interval distortion correctors for the channels 1 and 4 with respect to the channel center frequency, such detuning being in the case of the channel 1 toward the lower frequencies and in the case of the channel 4 somewhat toward the higher frequencies.

The advantage effected by the particular mode of connection provided by the invention, as considered with respect to the individual channel, resides in that the number of total reflections and the number of the filter flanks which are with respect to the running time distortions codetermining, become along the transmission path from the sender to the receiver equal to the number of total reflections and the number of operatively effective filter flanks in each other channel. In addition, there will result a particularly favorable relationship with regard to the values for the pass through attenuations in the individual channels.

FIG. 9 shows in schematic part sectional representation an advantageous embodiment of a timing- or running interval distortion corrector. The corrector comprises two wave guide sections H1 and H2 which are by means of a partition wall placed with their narrow sides adjacent one another, and which are in known manner mutually coupled over a coupling aperture L provided in the common partition wall, thus resulting in a so-called 3 *d*B-directional coupler. The upper left connection serves as an input and the lower left connection as the output of the distortion corrector. At each, the respective right upper and lower connections is connected a parallel resonance circuit, such resonance circuits having for the described embodiment a half value width respectively amounting to 80 megacycles, and being tunable by means of a common drive. The tuning is required so that the distortion corrector can be adjusted to the corresponding channel according to FIG. 8. The advantage of the illustrated directional coupler, for such a timing- or running time interval distortion corrector resides primarily in that the two wave guide sections H1 and H2, together with the two parallel resonance circuits K1 and K2, are disposed parallel to each other and have the same geometric length, thus resulting in particularly favorable structural conditions.

With the described distortion corrector can be obtained the transmission curves for the running- or time interval period, for the four channels 1 to 4 of FIG. 8, such as are shown in FIG. 10.

Upon using bridge circuit, the known circuit will generally be employed, wherein the side lines for the channel which is to be taken into use are, as shown in FIG. 11, connected in a loop extending over bandpass filters (either bandpass filters alone or band block filters; in the given embodiment only band block filters). According to the desired number of channels, such eight-poles are serially connected as shown in FIG. 11. The receiver side which is likewise schematically indicated in FIG. 11, is analogously constructed. The filters are in FIG. 11 referenced in the same manner as in the other figures. Letter R indicates the absorbers which terminate the respective transmitter branches. The outputs of the distributor circuits are, as in the previously discussed figures, designated by *a* to *d* and *a'* to *d'*, respectively. The common lead-in lines to the antenna are indicated at LI and LII.

Changes may be made within the scope and spirit of the appended claims which define what is believed to be new and desired to have protected by Letters Patent.

I claim:

1. A directional radio transmission and cooperating receiving system comprising a number of high-frequency transmission channels, to each of which is allocated an individual transmitter, a combining circuit arrangement operatively connecting the individual transmitters to a common antenna for transmission to a common receiving antenna, a separating circuit arrangement operatively connecting the receiving antenna to individual receivers of like construction, the combining circuit arrangement having different input points, each allocated to a different one of the several channels, which points correspond in circuit positions to a corresponding number of output points from the separating circuit, the input point of each individual channel to the combining circuit and its output point from the separating circuit being relatively selected so that each channel is subjected to the same number of reflection points between the transmitter and receiver and transist time difference between the signals in different channels are minimized.

2. A radio system according to claim 1, wherein delay distortion-correction devices of identical construction, and each including means for tuning to any one of the channels, are connected at least one to each transmitter and receiver.

3. A radio system according to claim 2, wherein each distortion-correction device comprises a 3 dB-directional coupler and includes two juxtaposed hollow conductors, rectangular cross-section, and together forming a directional coupler, one end of one hollow conductor serving as an input connection, and an adjacent end of the other hollow conductor serves as an output connection, and means provided at the other end of each of the two hollow conductors forming a cavity resonator exhibiting the characteristics of a parallel resonator circuit, and tuning means provided in each cavity resonator.

4. A radio system according to claim 1, wherein the combining and separating circuit arrangements each include at least one circulator, the latter in the combining circuit arrangement having, successively arranged in the direction of rotation, a plurality of inputs each for a separate one of the channels and a common output for the channels connected thereto, and in the separating circuit having, successively arranged in the direction of rotation, a common input for a plurality of channels and a plurality of separate outputs for said channels, at least one circulator in each of the respective arrangements being connected to an absorber succeeding the respective outputs thereof in the direction of rotation of the circulator.

5. A radio system according to claim 4, wherein the transmitters are coupled to their respective circulator input, and the receivers are coupled to their respective circulator output through respective filter circuits, each filter circuit being adapted to reflect signals in all frequency channels other than the channel with which it is associated.

6. A radio system according to claim 1, wherein the combining and separating circuit arrangements each include two interconnected circulators, each circulator in the combining circuit arrangement having, successively arranged in the direction of rotation, a plurality of inputs each for a separate one of the channels, and a common output for the channels connected thereto, and each circulator in the separating circuit having, successively arranged in the direction of rotation, a common input for a plurality of channels and a plurality of separate outputs for the channels connected thereto, the first circulator of each circuit arrangement having a common connection for all channels to the associated antenna, each circulator having separate connections for equal proportions of the total number of channels, the interconnection between the two circulators forming a common path for the channels allotted separate connections to the second circulator.

7. A radio system according to claim 6, wherein the respective proportions of the total number of channels in the receiver do not contain the same combination of channels as the corresponding proportions of the total number of channels in the transmitter.

References Cited by the Examiner

UNITED STATES PATENTS

| | | | |
|---|---|---|---|
| 2,705,795 | 4/1955 | Fisk et al. | 343—203 |
| 3,141,928 | 7/1964 | Davey et al. | 325—55 X |
| 3,150,374 | 9/1964 | Sunstein et al. | 325—56 X |
| 3,160,711 | 12/1964 | Schroeder | 325—55 X |

DAVID G. REDINBAUGH, *Primary Examiner.*

CURTIS L. JUSTUS, *Examiner.*

M. KRAUS, J. W. CALDWELL, *Assistant Examiners.*